United States Patent Office 3,435,473
Patented Apr. 1, 1969

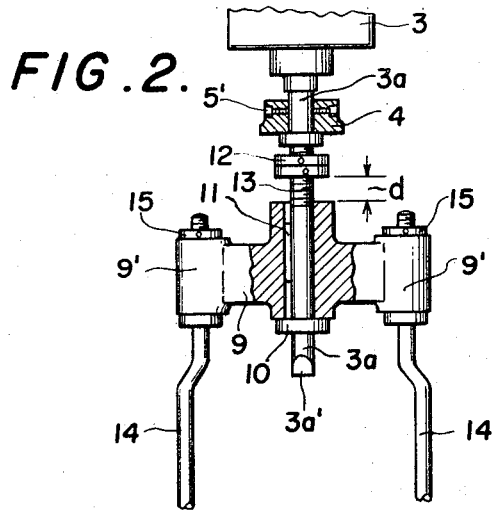

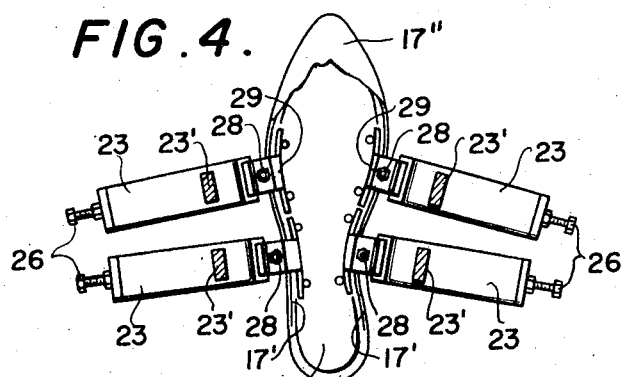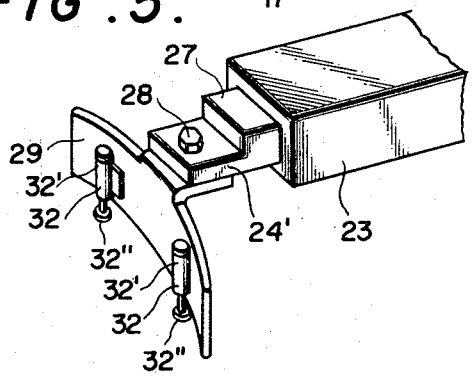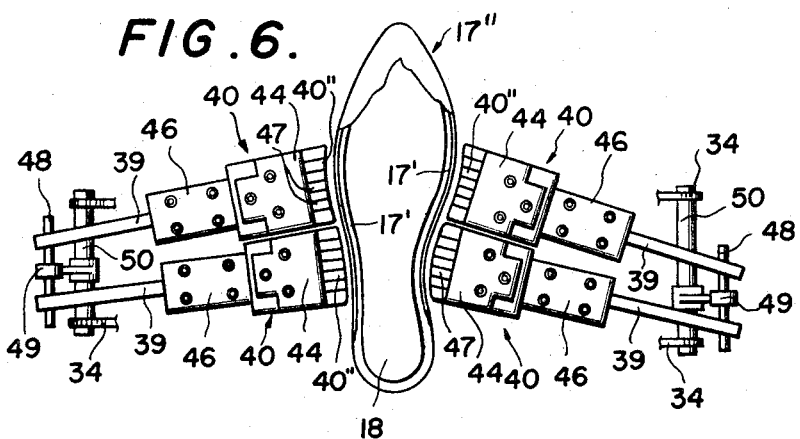

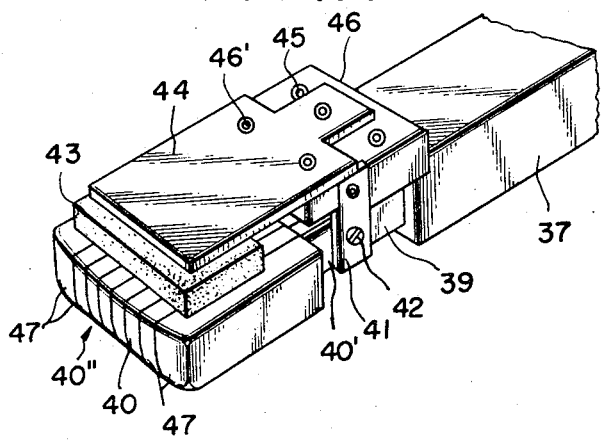
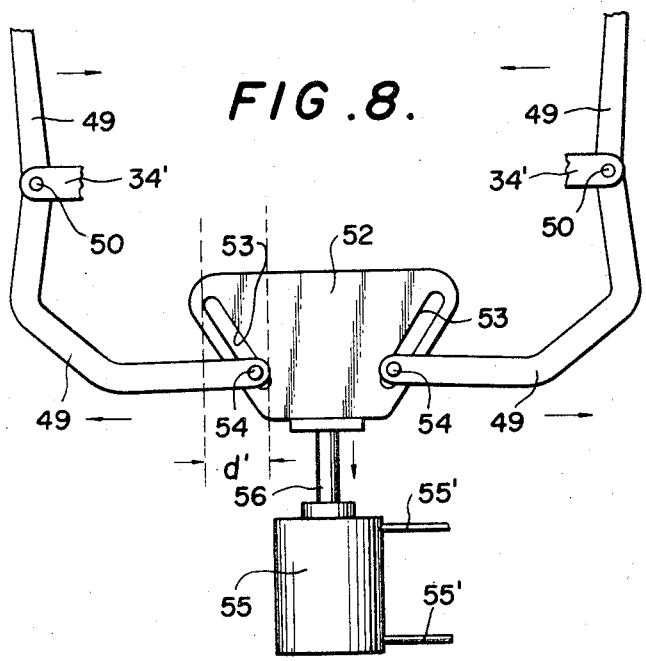

3,435,473
LASTING DEVICE FOR THE SHANK OF SHOES
Takero Ogawa, 12 Meguro Mansion, No. 2156, 4-chome, Kamimeguro, Meguro-ku, Tokyo, Japan
Filed Sept. 25, 1967, Ser. No. 670,320
Int. Cl. A43d 21/00, 23/00
U.S. Cl. 12—8.5                                          6 Claims

ABSTRACT OF THE DISCLOSURE

A lasting device for the shank of shoes which enables the lasting operations to be automatically carried out under the condition wherein the leather of the shank part of a shoe can be pulled tightly so that the lasting may be securely gripped and completely and easily done.

---

The present invention relates to a lasting device for the shank part of leather shoes, and more particularly to a lasting device whereby the lasting process or operations can be automatically carried out under the condition whereby the leather of the sides, and especially the shank part, of a shoe is pulled tightly over the last.

The object of this invention is to provide a lasting device whereby the shank part of a shoe, which is the most difficult in the operations of shaping the shoe, may be automatically lasted without requiring any particular skill in the art on the part of the operator.

In the manufacture of shoes, especially leather shoes, hitherto, the meticulous and difficult operation of lasting the leather under the tightly pulled condition inwardly over the last for the shank portion has required a most ingenious skill for craftmen.

The so-called shank of a shoe is a central, slightly lower, bottom part of the shoe, including both sides of this middle, lower part of the shoe that is a narrow part inwardly curved from both sides, and "the lasting" means shaping the sides of the upper over the last and up into the aforementioned form of the shoe.

Heretofore, in the lasting process of the shank part of the shoe, there has been employed a machine of a rotary screw type system which enables the sides of the upper to be screwed inwardly by means of a plurality of rod-like rotors whose external shape is spiral, but, in this system, the rotors revolve invariably in a certain fixed direction only, and therefore, the shank part is identically lasted on both sides so that the features of shoes which should conform to the lasts can not be fully presented and any desirable lasting can be hardly achieved because of readily leaving wrinkles in the lasting.

Furthermore, according to this prior art system, the shoe must necessarily be held skillfully and forcefully by the craftman's hands while lasting, thus reducing his working efficiency.

This invention will eliminate the defects as above-mentioned which are common with the conventional lasting devices, and the objects and advantages will become fully apparent from the further following description in reference to an embodiment of the invention and taken in connection with the appended drawings in which:

FIG. 2 is a side view of the wiper mechanism in operation showing it partly in vertical cross-section;

FIG. 3 is a partial side view showing the relationship between the wiper mechanism and the lasting section of the embodiment;

FIG. 4 is a plan view taken substantially on the line IV—IV of FIG. 1 showing the wiper mechanism partly viewed from above and also planely;

FIG. 5 is a partly enlarged, perspective view of the wiper mechanism;

FIG. 6 is a plan view of the lasting mechanism taken on the line VI—VI of FIG. 1, as viewed planely;

FIG. 7 is an enlarged, detailed view of one unit of the lasting mechanism; and

FIG. 8 is a schematic frontal view showing the actuating setup of the lasting mechanism.

Figure 1:
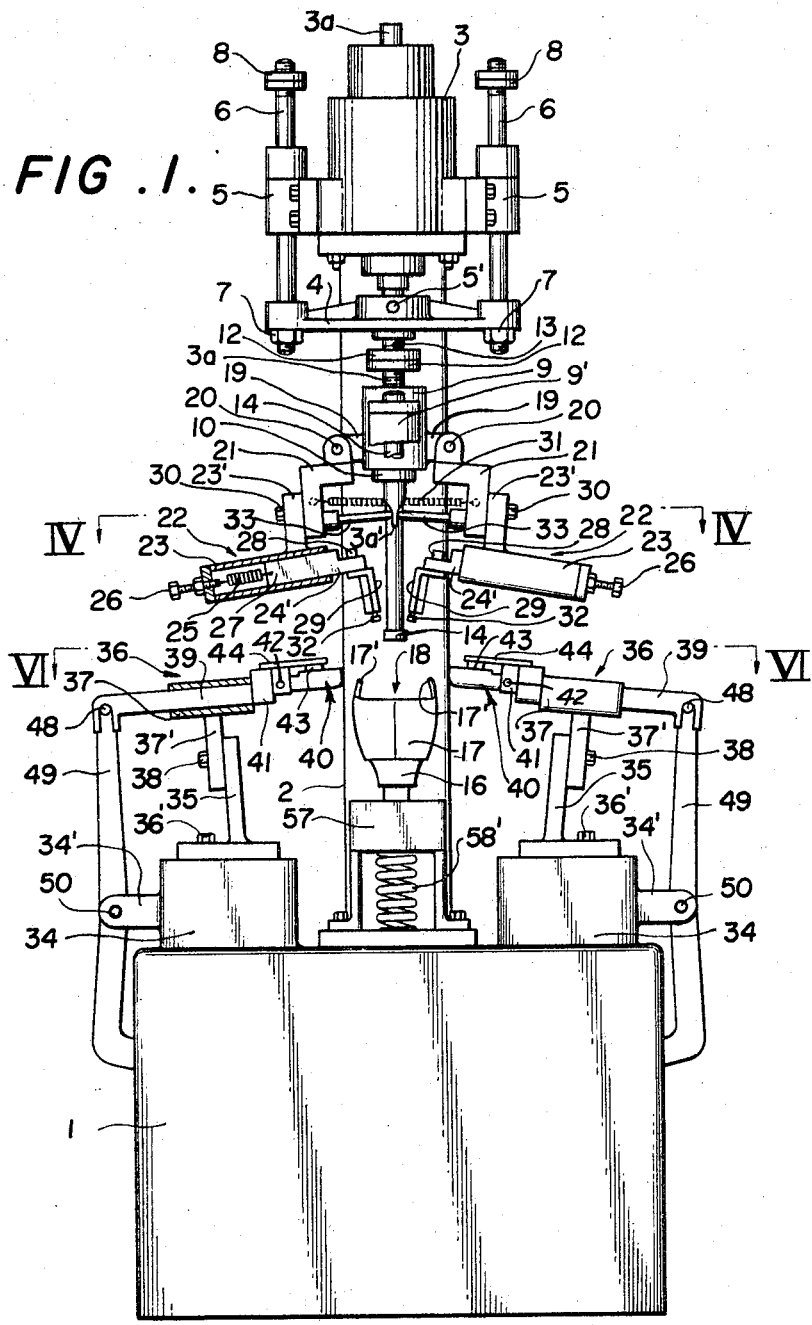
FIG. 1 is an entire, front view elevation showing some parts cut out and some sectional.

Referring to the drawings, in FIG. 1, numeral 1 denotes a steel-made, box-shaped machine stand; numeral 2 denotes a support pillar extending upwardly on the back of said stand 1, the upper end of said support pillar being bent substantially rectangularly in relation to the upward direction of said stand 1; and said bent portion of said pillar carries an oil-pressure cylinder mechanism 3 for actuating the wiper mechanisms 22 to be described hereinafter.

The oil-pressure cylinder mechanism 3 has an upright piston rod 3a vertically driven by a cylinder piston; said piston rod 3a is fixed by a screw 5' (FIG. 2) at the middle of a bearing arm 4 provided horizontally therewith; both ends of said bearing arm 4 are fitted onto, and fixed to, the lower ends of guide rods 6, 6 and nuts 7, said guide rods 6, 6 being slidably associated with brackets 5, 5 providen on opposite side of casing of said oil-pressure cylinder mechanism 3; said guide rods 6, 6 having adjusting screws 8, 8 on their top, by which the range of the vertical stroke of the piston rod 3a is determined.

The piston rod 3a extending below the bearing arm 4 is fitted with a first bracket 9 having fore and aft opposed bearing members 9', 9', all of which are borne by a ring 10, and further are slidably mounted with respect to said piston rod 3a through a key 11 so as to move axially of said rod 3a.

Numeral 12 denotes adjusting rings screw-fitted to the screw threads 13 formed around the piston rod 3a between the bearing arm 4 and said bracket 9, the vertical movement of said bracket 9 being adjusted through the regulation of said rings 12 vertically either up or down, so that the positions of the wipers 22 to be described may be regulated.

Numerals 14, 14 denote rods for holding the wood last 16, said rods 14, 14 being fixed at their upper ends by means of fitting-screws 15 to said bearing members 9' and extending downwardly with the lower end thereof applying pressure to the toe and heel parts of the insole 18 of an unfinished shoe 17 set over the last 16, when the piston rod 3a comes down, so that the insole 18 may be snugly fitted and fixed over the last 16.

On both sides of said bracket 9 there are provided, projecting bearing members 19, 19, (FIG. 1) which each pivotally carry an L-shaped bracket or prop 21, 21 by means of pivot pins 20. In other words, said prop bearing members 21, 21 are provided in pairs respectively on both sides of the central, piston rod 3a. The lower ends of said L-shaped brackets or props 21, 21 have the wiper mechanisms 22 respectively mounted thereon.

One wiper mechanism 22 comprises, as is shown in the cross section portion of FIG. 1, a slender, substantially level, case 23 which is inclined slightly higher gradually toward the center of the machine; a slider 27 which is telescopically fitted into said case 23 and whose outer end 24' protrudes out of the inner end of said case 23, and whose inner end within said case is constantly urged or pulled inwardly by means of a spring 25 attached by an adjusting screw 26; and a wiper plate 29 provided on its side with a plurality of plungers 32, said plate 29 being loosely and/or swively mounted onto the protruding end of said slider 27 with a screw 28.

As seen from FIG. 4, the afore-mentioned wiper mechanism 22 is provided in pairs on each side, with the wiper plates 29 attached loosely by screws 28 in a manner whereby they are bent downward substantially rectangularly relative to the substantially level sliders 27.

Each of the wiper plates 29 is slightly curved both in its vertical plane and along the lower edge (FIGS. 3, 4 and 5), so as to conform to the curve of the lasting portions of a shoe.

The plural plungers 32 of the wiper plates 29 comprise outer cases 32', and spring-biased tappets 32" which telescope within said outer cases and have their lower end projecting downward therefrom, said tappets being outwardly or downwardly urged by coil springs (not shown in the drawing).

The wiper mechanisms 22 are mounted by screws 30 on said L-shaped bracket props 21 by means of upper mounting pieces 23' on the cases 23, and said props 21 on both sides are inwardly biased toward each other by means of a strong coil spring 31. Accordingly, the wiper mechanisms 22 are mounted in a resiliently opposed manner on the props 21, said props 21 having rods 33, 33 which project generally horizontally toward the inside of the L-shaped props 21, 21 with the ends of said rods biased constantly in contact with the undercut sides of a downwardly directed wedge-like point 3a' of the piston rod 3a.

Numerals 34, 34 denote stay members provided upon opposite sides of the machine stand and from which stays the inverted T-shape supports 35, 35 extend upwardly, being secured thereto by screws 36', said supports 35 being provided respectively with the lasting mechanism units 36 facing each other in order to last the lasting margins 17', 17' of the shank of a shoe 17 onto the insole thereof.

The lasting mechanism 36 is shown in detail in FIGURES 6 and 7. As seen from FIG. 1 also, the mechanism 36 is located below said wiper mechanisms 22 and provided in a manner such as to come into conformity to the curved sides of the shoe respectively from both sides over the last 16, and there being two sets of sub-assembly pincers 40 on both sides, four in all.

One of the lasting mechanisms sub-assemblies 40 will be described herein, and as is shown in the cut-out portion of FIGS. 1 and 7, a hollow, slender tubular holder 37 having an attachment arm 37' is fixed by a screw 38 to the upwardly projecting support 35 so as to be inclined slightly higher toward the center of the machine, said holder 37 being provided slidably with a sliding lever 39 whose one end is rotatably fitted by means including a bolt 42 (FIG. 7) to the base 40' of the pincers sub-assembly 40 by way of a pincer bearing plate 41, said pincers sub-assembly 40 further including a pincer plate 44 mounted on its top having an elastic rubber plate 43 interposed between said top plate 44 and a plurality of pincer boards 47. The base of said pincer plate 44 is fixed by screws 46' on a support plate 46 also fixed by screws 45 to the upper end of said pincer bearing plate 41. The pincers 40 include the plurality of holding boards 47 aligned horizontally and in predetermined order with their side ends 40" projecting toward the side of the shoe 17 so as to conform to and for holding the curved sides of the shoe.

The plurality of boards 47 of each pincers 40 are connected with the sliding lever 39 by way of the rearwardly extended base 40' which is mounted onto the mechanism by bolts 42 the latter of which horizontally penetrate the sliding lever 39 and the base 40' of the pincers sub-assembly 40.

It is understood from the foregoing description, the, pincer board 47 can not rotate downwardly because of the disposition of support plate 46, but they can slightly rise upward in resistance against the elastic rubber plate 43. Alternatively, other resilient material such as spring or other resilient material may be used in place of the rubber plate 43.

In this manner said lasting mechanisms are provided on both sides of the shank part of the shoe 17 for the purpose of lasting the shoe 17.

The sliding levers 39 of the lasting mechanism 36, on each side of the shoe extend backward through the sleeve-like holders 37, with the other end of each lever being bifurcated downwardly to pivotally mount upon a horizontal pivot shaft 48 disposed transversely to the general direction of levers 39 upon the upper ends of upright rocking levers 49, 49.

The central parts of said levers 49 are pivotally attached by suitable pins 50 to bearing members 34', 34 protruding from the outer sides of the stays 34, 34, and the lower ends of said levers 49 are both bent and project inwardly within base stand 1. The terminal ends of the levers 49 have transverse pins 54 fitted loosely into slots 53 which are upwardly divergingly provided at opposite sides of an actuating board 52. Said actuating board 52 is fixed to the upper part of the piston 56 of an oil-pressure cylinder 55 and reciprocates vertically with the ascent and descent of said piston 56.

A detailed description of the conventional oil-pressure cylinder mechanism is not believed necessary, but suffice it to say that the cylinder 55 will work to move the piston 56 upon application of oil pressure thereto through pipes 55', with the opertaion of said oil-pressure cylinder mechanism preferable being remote-controlled by means of electromagnetic valve (not shown).

It is to be understood that, said oil-pressure cylinder mechanism 55 as well as said actuating board 52 are both disposal within the machine stand 1, from which the revolving levers 49 project on both sides.

Additionally, as seen in FIG. 1 numeral 57 denotes a stay for the wood last 16 and having its upper part supported by a coil spring 58'. A prop rod 58 (FIG. 3) is provided at the end of said stay 57 in order to give support from below to the toe part of the shoe 17 laid over the last 16.

The operation of the present invention, having the aforedescribed construction, will now be described:

To begin with (FIGS. 1, 3 and 6), the upper of the shoe 17 is fitted over the wood last 16 and the insole 18 is fixed and applied by a powerful adhesive to the lasting portions thereof to be ready for the next process. Prior to the fitting of the shoe's upper over the last 16, the toe portion 17" or the fore end of the shoe should have been folded into the insole 18, as is shown in FIGS. 4 and 7.

In this condition, a hydraulic fluid is fed into the upper oil-pressure cylinder mechanism 3 and the piston rod 3a is pushed down and lowered until the ends of the rods 14, 14 of the brackets come to strike respectively at the toe part and the heel part of the insole 18 of the last 16.

Continuously following said, lowering operation, the piston rod 3a is further lowered, as is shown in FIG. 2, a distance as predetermined by the adjusting rings 12, whereby the piston rod 3a will go straight down within the bracket 9 alongside of the key 11 while at the same time the rods 33, 33, engaging on the wedge-like point 3a' are spread horizontally thereby forcing L-shaped props 21, 21 outwardly against the springs 31 and rotatably about the pins 20 acting as a fulcrum. In this way the wiper plates 29 will work outwardly from inside to erect the lasting margins 17' of the shoe 17.

Since the wiper plates 29 of this device of the invention are loosely mounted by screws 28 to the sliders 27, they will freely swing or revolve relative thereto depending upon the degree of curve of the lasting margins 17' of the shoe or the thickness of the leather, and the wiper plates 29 will thereby prop said margins 17' from inside in a manner wherein said wiper plates 29 conform snugly to the lasting margins 17' of the shoe 17.

The wiper plate 29 being provided with a plurality of resiliently biased plungers 32 exert a pressure from above on the insole 18 by means of the tappets 32", thereby preventing the insole 18 from rising up responsive to the wiping action of said wiper plate 29.

Thereafter, as is schematically shown in FIG. 8, a hydraulic fluid is fed through the pipes 55' by opening the electromagnetic valve (not shown) and by virtue of remote control so as to actuate the piston 56 in the arrow direction thereby lowering the actuating board 52.

In as much as the lower ends of the levers 49 are loosely pinned to operate in the sliding slots 53 said lower ends thereby move the distance $d'$ in the arrow direction from the position shown in FIG. 8 responsive to the descent of the actuating board 52, and the upper ends of the levers 49 will move reversely in the arrow directions, so that the sliding levers 39 and the lasting mechanism carried thereby on their fore end will be pushed inwardly toward those carried on the opposed arms 39.

Accordingly, the margins 17' will be securely held between the wiper plates 29 that are inside and the pincer sides 40" of the sub-assembly pincers 40 of the lasting mechanisms; and when said pincers 40 are further pushed forward against the biasing or checking springs 25 of the wiper plates 29, the margins 17' will be eventually pushed down onto the insole 18 by said pincers 40 and will thence be securely bonded to the insole with a strong pressure from above responsive to the still further advancing pincers 40, it being understood that the circumference of the insole 18 has beeen previously applied with an adhesive.

In the present device, the pincers 40 comprise a number of adjustable split board members 47 horizontally aligned in predetermined order, and therefore, they are conveniently and advantageously adapted to securely press the margins 17 entirely against the insole 18.

Furthermore, the pincers 40 at all time are under pressure from above and pressed by the pincer plates 44 through the rubber plate members 43, and therefore, they are also conveniently and advantageously adapted to resiliently press the margins 17' from above.

In lasting the margins 17' of the shoe by the present device, said margins are not pressed onto the insole 18 merely from sides but they are first held erect and upright from the inside by the wiper plates 29, and subsequently they are concurrently held from the outside also by the pincers 40 so that the leather of said margins 17' can be pulled tightly as desired and as provided condition is brought forth herein in practice, and thereafter said pincers 40 are further steadily advanced, are firmly pressed and secured upon the insole 18, and therefore, the shoe lasting is perfectly achieved with the leather being completely and snugly fitted over the last 16.

After the margins 17' are pressed upon the insole 18 by the pincers 40, simultaneously responsive to an initial reverse feeding of a hydraulic fluid into the oil-pressure cylinder mechanism 3, and thus when the piston rod 3a and the wiper mechanism are elevated to be restored back to the position as shown in FIG. 1, the construction hereof is such that the pincers 40 will dwell and remain for about 2 to 3 seconds in this position in order to sufficiently compress the margins 17' onto the insole 18, whereafter another oil-pressure operation will be carried out to have the lasting mechanism fully restored back to their original positions so that the piston 56 and the actuating board 52 will be returned to the position as shown in FIG. 8, followed thereafter by releasing the inward tightening by the levers 49.

In this manner, the lasting mechanisms also will return back to their original positions so as to be ready for the next action.

It is to be noted that the foregoing embodiment of the present device relates to one which will carry out the process for lasting only the right-foot shoe, and therefore, the lasting device for the left-foot shoe necessarily should also be prepared in practice so that one set of machining may consist of two units to last both of the right and left foot shoes as a matter of course, but it will suffice for this purpose that in practice only the curved shape of the foregoing wiper plates as well as the shape of the sides of the foregoing pincers are altered so as to be adaptable to the left-foot shoe, and all the rest of the machine is identical with that as described for the foregoing right-foot shoe.

From the foregoing description, it will be understood that the device of this invention carries out the lasting of the shank portions of shoes automatically and that the lasting process is superior over known prior art, whereby improved shoe products result because the leather can be pulled tight, and free from wrinkles and creases.

With respect to the driving power source for the present device, the oil-pressure cylinder mechanism has been exemplified hereinabove, but other driving sources, such as air pressure by compressor or electric motor, may also be possible.

While a particular embodiment of this invention has been illustrated and described, modifications thereof will occur to those people in the art. It should be understood therefore that the invention is not limited to the particular arrangement disclosed hereinabove but that the appended claims are intended to cover all modifications which do not depart from the true spirit and scope of the invention.

What is claimed is:

1. A lasting device for shoes and particularly for lasting the shank portion of shoes by attaching the marginal edges of a shoe upper to the insole portion which comprises:
  (a) a machine stand provided with means supporting a wood last on its upper face and having a support pillar standing upright on the back of said stand and projecting above said last;
  (b) a piston rod mounted onto the upper part of said support pillar above said last and means for moving said rod up away and down toward the shoe last;
  (c) bracket means fitted to said piston rod;
  (d) said bracket means includes a first support bracket having depending rods provided in the front and back thereof for pressing the heel and toe parts of a shoe fitted over the last;
  (e) a plurality of generally horizontally arranged, wiper mechanisms attached to other prop brackets pivotally mounted on both sides of said first bracket, said prop brackets biased inwardly by way of inwardly pulling spring means therebetween; and
  (f) said wiper mechanisms provided with a plurality of opposed wiper plates, means to spread said wiper plates outwardly from each other responsive to downward travel of said piston rod to thereby resiliently prop the margins of both opposed sides of the shank portion of an insoled shoe as fitted over the last in a condition whereby said margins are raisable from inside;
  (g) a plurality of lasting mechanisms located below said wiper mechanisms and on both sides of said wood last, comprised of pincer sub-assemblies made up with a number of resiliently cushioned holding board pincer members which are horizontally aligned in progressive order corresponding to a given curvature of the shank portion, and provided with means to freely reciprocate said pincer sub-assemblies relative to the shoe over the last; and
  (h) characterized further by including means for actuating the pincers of said lasting mechanisms in cooperation with and adjacently against said wiper plates to grip and to last inwardly the margins of the shank portion of the shoe.

2. The device as claimed in claim 1 having:
  (a) the lower end of the piston rod being wedge-shaped;
  (b) rod means including opposed rigid rods protruding horizontally from said prop brackets of both sides toward each other and resting on the wedge-shaped lower end; and
  (c) said wiper plates as supported indirectly by said prop brackets are adapted to be spread apart by the rods of both sides responsive to downward wedging action by downward travel of the rod.

3. The device as claimed in claims 1 or 2 wherein
   (a) the wiper mechanisms each include a resiliently mounted slider;
   (b) said wiper plates being attached to the forward ends of said sliders; and
   (c) said sliders being resiliently limited in their forward travel by coil spring means including adjusting screws connected to the rearward end of said sliders.

4. The device as claimed in claims 1 or 2 in which the wiper plates are provided on their inner side with plunger means for exerting a downward holding force on the insole from above.

5. The device as claimed in claims 1 or 2 in which
   (a) the wiper mechanisms each further include a resiliently mounted slider on which the wiper plates are mounted and
   (b) the wiper plates are curved alongside of the shank portion of the shoe, and are loosely and swively mounted on the forward end of said sliders.

6. The device as claimed in claims 1 or 2 in which the pincer board members are horizontally aligned in progressively adjusted order to correspond to the curvature of the shank portion of the shoe, and their upper portions are pressed and resiliently biased by an elastic material set adjacently above said board members.

References Cited

UNITED STATES PATENTS

| | | | |
|---|---|---|---|
| 361,363 | 4/1887 | Kelley | 12—10.1 |
| 436,852 | 9/1890 | Forbes | 12—10.1 |
| 458,000 | 8/1891 | McKay et al. | 12—10.1 |
| 3,174,169 | 3/1965 | Lillbob | 12—10.1 |

PATRICK D. LAWSON, *Primary Examiner.*

U.S. Cl. X.R.

12—10.1